United States Patent [19]

Kreutzig

[11] Patent Number: 4,542,959

[45] Date of Patent: Sep. 24, 1985

[54] COLOR CORRECTION FILTER AND METHOD OF TAKING UNDERWATER PHOTOGRAPHS THEREWITH

[76] Inventor: Kirk Kreutzig, 621 E. Benton, Naperville, Ill. 60540

[21] Appl. No.: 516,579

[22] Filed: Jul. 25, 1983

[51] Int. Cl.$^4$ ............................................. G02B 5/22
[52] U.S. Cl. ..................................................... 350/311
[58] Field of Search .................... 350/311, 320; 354/64

[56] References Cited

U.S. PATENT DOCUMENTS

| | | | |
|---|---|---|---|
| 3,294,556 | 12/1966 | Harrington | 350/311 |
| 3,571,649 | 3/1971 | Bush, Jr. | 313/312 |
| 3,588,215 | 6/1971 | Singh . | |
| 3,619,624 | 11/1971 | Sorenson | 250/218 |
| 3,929,487 | 12/1975 | Singh . | |

OTHER PUBLICATIONS

Peter Rowlands, *The Underwater Photographer's Handbook*, pp. 74–75, May, 1983.
George Hurst, *Colour, A Handbook of the Theory of Color*, pp. 34, 35, 49; 1900.
A. P. Kuleshov et al., "Thin-Film Absorption Light Filters", Sov. J. Opt. Tech. 46 (1), Jan. 1979, p. 51.

*Primary Examiner*—Jon W. Henry
*Attorney, Agent, or Firm*—Todd S. Parkhurst

[57] ABSTRACT

A color correction filter is disclosed, which is especially adapted for use in underwater photography. The filter has a transparent element which passes impinging light wavelengths as follows:

| Light wavelength, nm | % incident light transmitted |
|---|---|
| 400 | 25 |
| 450 | 12 |
| 470 | 8 |
| 500 | 4 |
| 520 | 7 |
| 570 | 50 |
| 600 | 87 |
| 700 | 90 |

A method of taking underwater photographs utilizing this filter is also disclosed. The method includes causing daylight to travel through seawater to the subject, and reflected light from the subject to the camera, over a total distance of less than about 50 feet.

11 Claims, 5 Drawing Figures

FIG. 3
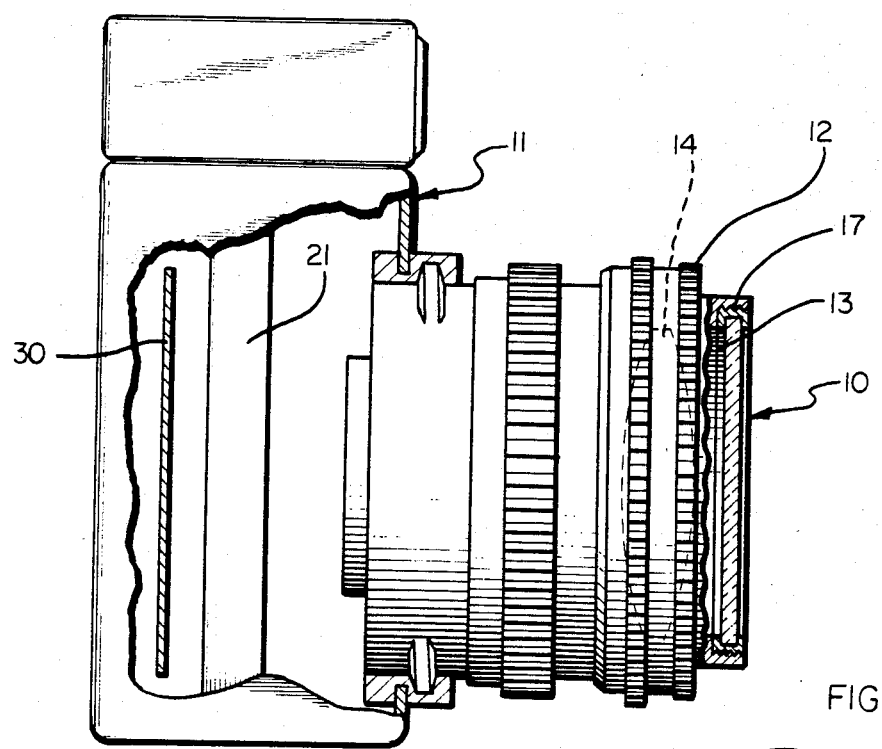
FIG. 2
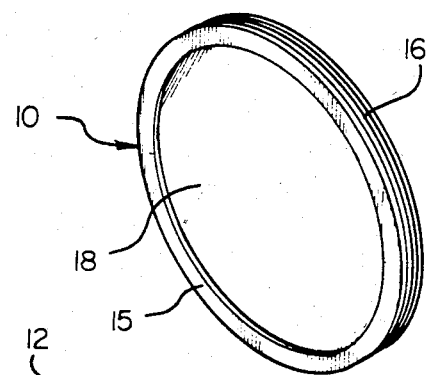
FIG. 5
FIG. 4
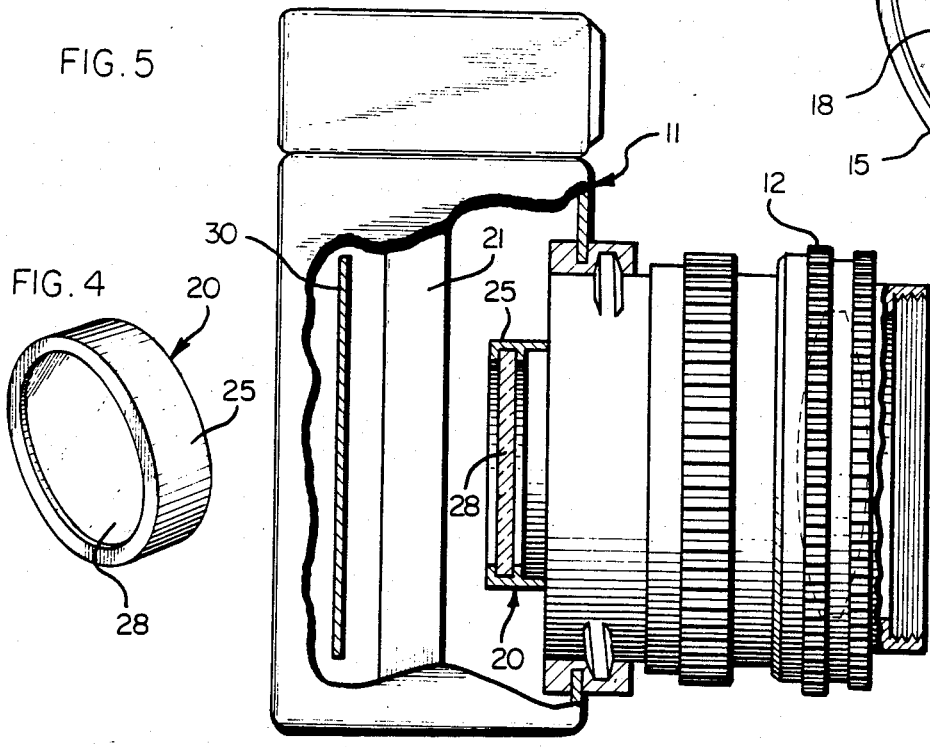

COLOR CORRECTION FILTER AND METHOD OF TAKING UNDERWATER PHOTOGRAPHS THEREWITH

BACKGROUND OF THE INVENTION

This invention relates to photographic filters, and more particularly concerns a filter which will produce accurate color pictures taken in moderately deep sea water.

Underwater photography is enjoying a great rise in popularity. Thousands of recreational and commercial scuba divers, underwater photographers and snorklers have discovered the astonishing life-forms and brilliant colors to be photographed under the surface of the seas.

As these photographers have discovered, however, water acts as a powerful light filter. Uncorrected photographs taken at depths of greater than about 5 feet of seawater are predominantly cyan in cast, and photos taken at depths of about 50 feet may show only varying shades of cyan and grey. Such photographs are not attractive, and they do not represent accurately the colors which are naturally present.

To overcome this color loss, many photographers use photographic flash units. These units are expensive, not always reliable, and limit the photographer to pictures having camera-to-subject distances of less than 8 feet, and preferably less than 4 feet.

An alternate method of overcoming color loss is to use a color correcting filter in conjunction with the camera. Commonly used filters are those known as color correcting 10 red (CC10R) and color correcting 20 red (CC20R). These filters were not originally designed for use in seawater, and provide insignificant, if any, color correction. Pictures taken using these filters have a slightly altered, but still very dominant and unattractive cyan cast.

It is the general object of the present invention to provide a photographic filter for use in underwater photography which permits chromatically correct pictures to be taken at depths of up to 50 feet or more of seawater without flash units or other artificial light sources.

It is another object to provide a filter which will not deteriorate or change optical properties even long after its manufacture, or after extensive use.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 2 is a perspective view of the novel filter as it is embodied for use in front of the camera lens;

FIG. 3 is a schematic-form side elevational view of a camera equipped with the novel filter in front of the camera lens;

FIG. 4 is a perspective view of the novel filter as it is embodied for use behind the camera lens; and FIG. 5 is a schematic-form side elevational view of a camera equipped with the novel filter behind the camera lens.

DETAILED DESCRIPTION

Figure 1:
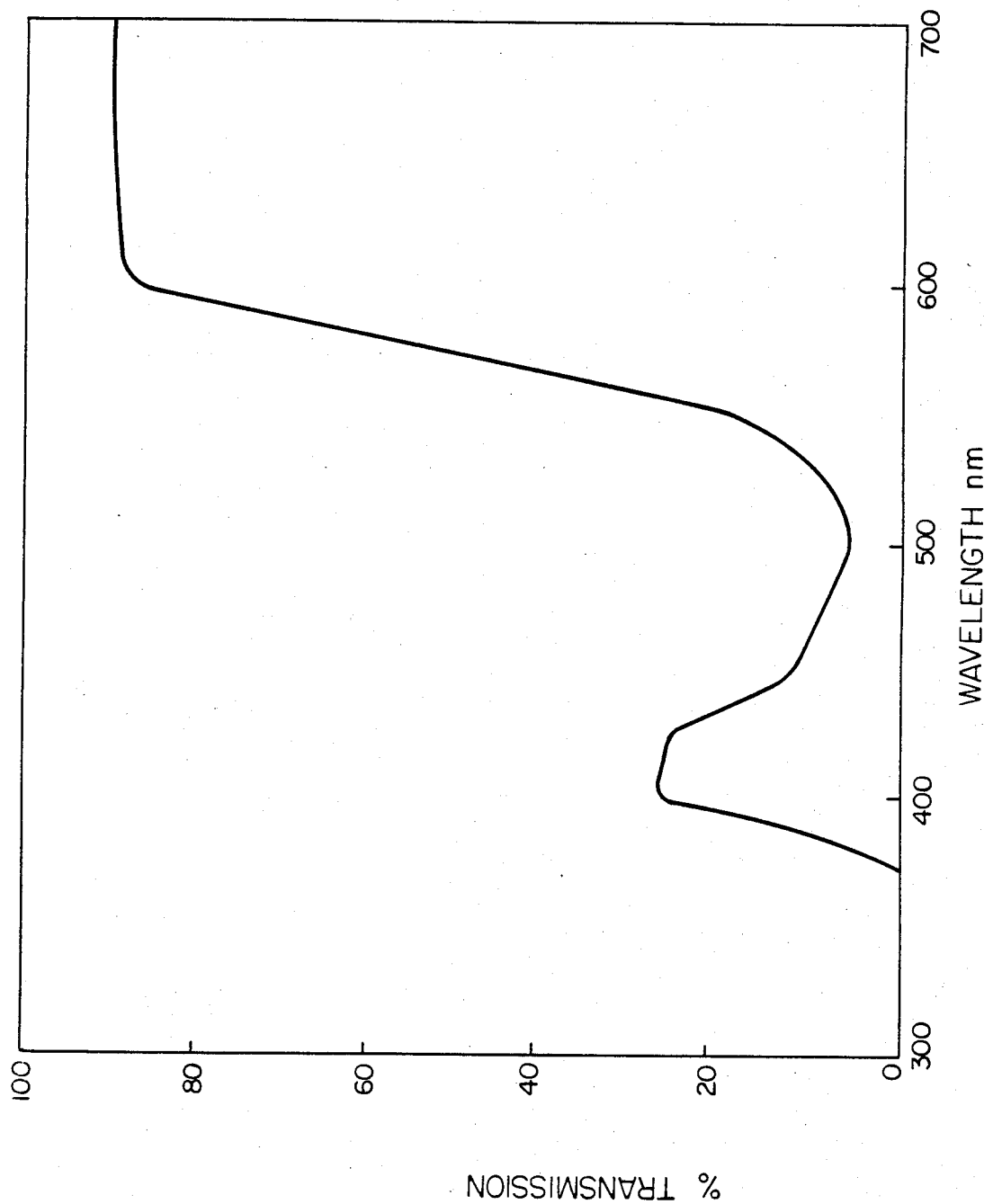
FIG. 1 is a graph showing the transmission of specific wavelengths of light (or spectral transmission response curve) of the novel underwater color correcting filter made in accordance with the invention.

While the invention will be described in connection with a preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

I have discovered that, contrary to popular belief, most if not all wavelengths of visible light are present in seawater at depths of up to 50 feet of seawater or even more. Some wavelengths or colors of light are present in greatly diminished quantities at relatively great depths of seawater, however. The seawater acts as a powerful and complex continuous light filter, and underwater photography must take this filtering effect into account if chromatically correct pictures are to be produced.

I have also discovered that a number of factors must be considered in the design of underwater filters for seawater.

First, materials dissolved and suspended in water affect the light- and color-filtering properties of that water. The filtering action of perfectly pure water itself must also be accounted for.

Second, the total distance that light must travel through the water prior to reaching the photographic film affects the quality or chromatic composition of that light. That is, the total distance which daylight must travel from the water's surface to the subject, plus the distance the reflected light must travel from the subject to the camera, will affect the color recorded on film.

Third, a proper filter must provide an accurate representation of the total visual color spectrum present in seawater. That is, the nature of the actual colors of the photo subject must be taken into account. Many of these actual colors are, in fact, in the blue family. Thus, blue cannot be eliminated or excessively suppressed. Red subject colors must be encouraged in the photograph, and yellows must be properly balanced against the reds and blues. Experimentation with standardized color cards and grey cards at underwater sites has been helpful.

In accordance with the invention, a color correction filter having the spectral transmission curve shown in FIG. 1 has been found to produce photographic slides, prints, and movie film having surprisingly life-like, vibrant and true colors to depths of 50 feet or greater. Important data points on this curve are:

| Light wavelength, nm | % incident light transmitted |
| --- | --- |
| Below 370 | 0 |
| 400 | 25 |
| 410 | 27 |
| 450 | 12 |
| 470 | 8 |
| 500 | 4 |
| 520 | 7 |
| 550 | 18 |
| 570 | 50 |
| 600 | 87 |
| 700 | 90 |

For best results, the filter should be attached to the camera lens at either the lens front or rear, as explained below. The photographic subject should be in more than 8 feet of water. The water should be generally cyan-colored, whether it is seawater or freshwater. The subject and camera should be located so that the daylight travels a total distance of from 8 to 50 feet through the seawater. That is, the total distance from the sea surface to the subject plus the distance from the subject to the camera should be more than 8 feet and less than 50 feet. Standard still or movie film balanced for use in daylight should be used.

The filter can have an in-front-of-the-lens format 10, shown in FIG. 2, which is designed for installation upon a camera 11 and lens 12, as shown in FIG. 3. This in-front-of-the-lens format 10 includes a ring 15 or other means for securing the filter 10 to the lens 12. Here the ring 15 is provided with male threads 16 for mating with female threads 17 on the lens 12. Known separate step-up or step-down rings (not shown) can be used to attach the filter 10 to the lens 12.

If the camera is of the direct-immersion, non-housed type, the space 13 between the filter 10 and the lens front element 14 should be flooded. That is, the filter 10 should be attached to the lens 12 when both filter 10 and lens 12 are underwater. This procedure will avoid the imbalance of water pressure only on the outside of the filter 10. Such underwater pressures on the filter can easily exceed 25 psig. If not balanced, these pressures can break, deform or otherwise damage the filter or camera. Less preferably, flooding grooves (not shown) can be produced in the ring 15 to automatically admit water to the space 13 between the lens element 14 and filter 12.

If the camera is of the housed type, the filter 10 will be located inside the housing when the camera is used underwater. No filter flooding will be required.

Mounted in the filter ring 15 is a transparent element 18. In further accordance with the invention, the element 18 provides a long service life without deterioration or material change in optical properties. To this end, the element 18 is preferably made of high quality optical colored glass, having substantially constant light-passing properties throughout. Embodiments formed of plastic have been found to be less successful, because they have limited service life, and because of other factors.

Alternatively, the filter can have a behind-the-lens format 20, as shown in FIG. 4. This behind-the-lens mounting allows chromatically correct images to be recorded on film when ultra-wide-angle lenses are used. Filters usually cannot be conveniently mounted in front of ultra-wide-angle lenses, because forward optical elements may extend beyond the lens bodies. This format includes a mounting ring 25 for securing the filter 20 to the rear element of the lens 12, preferably at a location between the lens 12 and the camera shutter 21 as shown in FIG. 5. It has been found desirable to mount the filter 20 as close to the lens 12 as possible, preferably within 0.25 mm or less, to avoid interference with operation of the shutter 21 or other camera mechanisms.

It has also been found desirable to form the behind-the-lens filter 20 with a filter element 28 which is as thin as possible, to avoid significantly shifting the plane of focus of the photographic image materially away from the plane of the film 30. Accordingly, this element 28 is preferably less than 0.25 mm thick. Again, this element 28 is preferably made of high quality optical glass.

The invention is claimed as follows:

1. A color correction filter for use in underwater photography, comprising, in combination, mounting means for mounting the filter to a camera to be used underwater, and a transparent element secured to the mounting means and passing impinging light wavelengths as follows:

| Light wavelength, nm | % incident light transmitted |
| --- | --- |
| Below 370 | 0 |
| 400 | 25 |
| 410 | 27 |
| 450 | 12 |
| 470 | 8 |
| 500 | 4 |
| 520 | 7 |
| 550 | 18 |
| 570 | 50 |
| 600 | 87 |
| 700 | 90. |

2. A color correction filter for use in underwater photography according to claim 1 wherein said transparent element is formed of colored glass.

3. A color correction filter for use in underwater photography according to claim 1 wherein said transparent element is formed of optical glass having substantially constant light-passing properties throughout.

4. A color correction filter according to claim 1 wherein said mounting means is adapted for connection to the front of a camera lens.

5. A color correction filter according to claim 1 wherein said mounting means is adapted for connection to the rear of a camera lens at a position between the lens and the film plane of the camera.

6. A color correction filter for use in underwater photography comprising, in combination, mounting means for mounting the filter to a camera to be used underwater, and a transparent element secured to the mounting means and passing incident light wavelengths as follows:

| Light wavelength, nm | % incident light transmitted |
| --- | --- |
| 400 | 25 |
| 450 | 12 |
| 470 | 8 |
| 500 | 4 |
| 520 | 7 |
| 570 | 50 |
| 600 | 87 |
| 700 | 90. |

7. A color correction filter according to claim 6 wherein said transparent colored element is less than 0.25 mm thick, and wherein said mounting means is adapted to locate said transparent colored element less than 0.25 mm from the rear surface of the rear optical element of the camera lens.

8. A method of taking underwater photographs comprising the steps of placing a light filter between a photographic subject and photographic film in association with a camera and lens, placing the camera, lens, and filter in cyan water at a depth of from about 8 feet to about 50 feet, causing daylight to travel through the seawater to the subject, and from the subject through seawater and through the filter and lens, filtering the light wavelengths passing through the filter as follows:

| Light wavelengths, nm | % incident light transmitted |
| --- | --- |
| 400 | 25 |
| 450 | 12 |
| 470 | 8 |
| 500 | 4 |
| 520 | 7 |
| 570 | 50 |
| 600 | 87 |
| 700 | 90 | and causing the filtered light to impinge upon a color-responsive material.

9. A method of taking underwater photographs according to claim 8, including the step of causing said filtered light to impinge upon daylight-type balanced photographic film.

10. A method of taking underwater photographs according to claim 8, including the step of locating the subject at a distance of from 1 to about 10 feet from the camera.

11. A method of taking underwater photographs according to claim 8, including the step of causing the daylight to travel a total distance of from about 8 to about 50 feet through seawater from the sea surface to the subject and thence from the subject to the filter prior to its passage through the filter.

* * * * *